United States Patent [19]

Johansson

[11] Patent Number: 5,158,245
[45] Date of Patent: Oct. 27, 1992

[54] FISHING REEL OF THE MULTIPLIER TYPE
[75] Inventor: Arne Johansson, Mörrum, Sweden
[73] Assignee: Abu Garcia Produktion AB, Svängsta, Sweden
[21] Appl. No.: 650,837
[22] Filed: Feb. 5, 1991
[51] Int. Cl.$^5$ .......................................... A01K 89/033
[52] U.S. Cl. ..................................... 242/261; 242/262
[58] Field of Search ................................ 242/261, 262

[56] References Cited

U.S. PATENT DOCUMENTS

| | | | |
|---|---|---|---|
| 4,341,366 | 7/1982 | Kawada | 242/261 |
| 4,564,158 | 1/1986 | Mossberg et al. | 242/261 |
| 4,593,869 | 6/1986 | Yasui et al. | 242/261 |
| 4,674,699 | 6/1987 | Fukushima et al. | 242/261 |
| 4,747,560 | 5/1988 | Karlsson | 242/260 |
| 4,919,360 | 4/1990 | Roberts | 242/260 |

Primary Examiner—Daniel P. Stodola
Assistant Examiner—Tony A. Gayoso
Attorney, Agent, or Firm—Browdy and Neimark

[57] ABSTRACT

A fishing reel of the multiplier type has a frame and a shaft extending through the frame and carrying a rotatable line spool. A clutch member is mounted on the shaft to be shifted between a coupling position, in which it engages the line spool for rotating it, and a neutral position, in which it is disengaged from the spool. A mounting plate carried by the frame has a plurality of mounting pins parallel to the shaft. The mounting plate carries on these pins a clutch mechanism having a yoke in which the clutch member is rotatably mounted and which is displaceably mounted on two of the mounting pins for shifting the clutch member between its two positions. A spring presses the yoke in such a direction that the clutch member is urged towards its coupling position. A link arm is pivotally mounted at one end on one of the mounting pins and has at its other end a pivot pin on which a U-shaped member is pivotally mounted. The link arm is pivotable by a trigger. The U-shaped member has cam portions adapted, when the link arm is pivoted from a first position to a second position and upon a resulting pivotal movement of the U-shaped member from a first pivoting position to a second pivoting position against the action of the spring, to move the yoke to a position in which the clutch member is in its neutral position.

1 Claim, 4 Drawing Sheets

//  5,158,245

FISHING REEL OF THE MULTIPLIER TYPE

BACKGROUND OF THE INVENTION

The present invention relates to a fishing reel of the multiplier type.

Known fishing reels of this type generally have a frame with two side plates, a line spool shaft extending through the frame, and a rotatable line spool mounted on the line spool shaft. A mounting plate arranged on the frame inwardly of one side plate thereof has a spindle parallel to the line spool shaft and extending through said one side plate, and a central hole through which the line spool shaft extends. A handle is mounted on the spindle outside said one side plate. A driving gear and a toothed wheel are mounted on the spindle and adapted to be rotated by means of the handle. A clutch means is mounted on the line spool shaft in the center hole of the mounting plate and has a gear portion meshing with the driving gear to be rotated thereby. The clutch means is displaceable along the line spool shaft between a coupling position, in which it engages the line spool for rotation thereof, and a neutral position, in which it is disengaged from the line spool. A clutch mechanism operable by means of a manually adjustable trigger is mounted on the mounting plate for shifting the clutch means between its two positions.

When a cast is to be made, the trigger is actuated for shifting the clutch means to its neutral position. When the clutch means is in its neutral position, the line spool can rotate freely. The clutch mechanism is so designed that it will return the clutch means to its coupling position when the angler starts turning the handle in the direction of line retrieve, i.e. the direction in which the part of a line, fixed to the line spool, that has been paid out during the cast is again wound onto the spool.

Known clutch mechanisms comprise a large number of components and therefore are relatively complex and difficult to mount.

In some prior art fishing reels (see e.g. U.S. Pat. No. 4,564,158), the fishing reel has, in addition to the trigger, a further manually adjustable means. This can be set in two different positions. When it is in one position, the trigger and the clutch mechanism operate as described above. However, when it is in the other position, it acts on the clutch mechanism so as to return the clutch means to its coupling position as soon as the trigger is released. The clutch means can then be returned more quickly than if the return movement is carried out by means of the handle. Such a faster return movement is desirable in a special fishing technique.

SUMMARY OF THE INVENTION

The object of the present invention is to provide a fishing reel having a comparatively simple clutch mechanism with a minimum number of parts, which is extremely easy to mount on the mounting plate, the mounting operation being carried out most advantageously in an automatic assembly machine, and which can be easily supplemented to permit carrying out the above-related quick return of the clutch means.

According to the present invention, this object is achieved by means of a fishing reel of the multiplier type comprising a frame with two side plates;
a line spool shaft extending through said frame;
a rotatable line spool mounted on said shaft;
a mounting plate arranged on the frame inwardly of one side plate thereof and having a spindle parallel to the line spool shaft and extending through said one side plate, a center hole through which the line spool shaft extends, two first mounting pins substantially diametrically opposed with respect to said center hole, a second mounting pin and a third mounting pin, said first, second and third mounting pins being parallel to the line spool shaft and projecting towards said one side plate;
a handle mounted on said spindle outwardly of said one side plate;
a driving gear and a toothed wheel which are mounted on said spindle and adapted to be rotated by means of said handle;
clutch means mounted on the line spool shaft in the center hole of said mounting plate and having a gear portion meshing with said driving gear to be rotated thereby, and being displaceable along the line spool shaft between a coupling position, in which it engages the line spool for rotation thereof, and a neutral position, in which it is disengaged from the line spool;
a yoke having a center portion, in which said clutch means is rotatably mounted, and being displaceably mounted on said two first mounting pins for shifting said clutch means between said two positions;
a retainer member arranged between said mounting plate and said one side plate and supporting first resilient means adapted to press said yoke in such a direction that said clutch means is urged towards its coupling position;
a link arm pivotally mounted at one end on said second mounting pin and having at its other end a pivot pin projecting towards said one side plate parallel to the line spool shaft;
a substantially U-shaped member having a first and a second leg extending in between said mounting plate and said yoke on each side of the line spool shaft, and a web portion pivotally mounted on the pivot pin of said link arm, the first leg of said U-shaped member having at its free end a projection for cooperating with said toothed wheel, and a guide curve for cooperating with said spindle, and each leg having a cam portion for cooperating with said yoke;
second resilient means mounted on the third mounting pin and engaging with the U-shaped member for urging it in such a direction about said pivot pin that said guide curve is pressed against said spindle, said U-shaped member being pivotable against the action of said second resilient means between two stable pivoting positions in which it is held by said second resilient means, namely a first pivoting position in which said projection is located radially outwardly of said toothed wheel and the cam portions of said two legs are located at the side of said yoke which then is held in such a position of displacement by said first resilient means that said clutch means is in its coupling position, and a second pivoting position in which said projection engages said toothed wheel in order, upon rotation of the handle, to be removed thereby and, together with said second resilient means, move said U-shaped member to its first pivoting position, and in which the cam portions of said two legs have been introduced between the mounting plate and the yoke and, against the action of said first resilient means, have moved the yoke to such a position of displacement that said clutch means is in its neutral position;

and a trigger by means of which said link arm is pivotable against the action of said second resilient means on said U-shaped member about said second mounting pin between a first position and a second position, in which said U-shaped member is maintained in its first and its second pivoting position, respectively, by said second resilient means.

In a preferred embodiment, the trigger is pivotally mounted on a pin parallel to the line spool shaft and carried by the frame, and wherein the trigger has an operating stud parallel to the line spool shaft and extending through an elongate hole in the mounting plate for engaging the link arm in order, when the trigger is pivoted from a starting position to a disengaging position, to move the link arm from its first position to its second position.

To ensure the above-related quick return of the clutch means, this preferred embodiment can be supplemented with a switch which is carried by the trigger and by means of which the operating stud is axially displaceable to a position in which it extends beyond the link arm in order, when the trigger is pivoted from said starting position towards said disengaging position, to be brought into engagement with a stop lug formed on said retainer member when the trigger comes to an intermediate position and, hence, before the link arm reaches its second position, the cam portions of said U-shaped member being so shaped as to hold said yoke in such a position of displacement that the clutch means is disengaged from the line spool when the trigger is in said intermediate position, and the position of said stop lug being such that said second resilient means will return said U-shaped member to its first pivoting position when the trigger is released when in said intermediate position.

BRIEF DESCRIPTION OF THE DRAWINGS

The invention will now be described in more detail with reference to the accompanying drawings, in which.

DESCRIPTION OF THE PREFERRED EMBODIMENT

Figure 1:
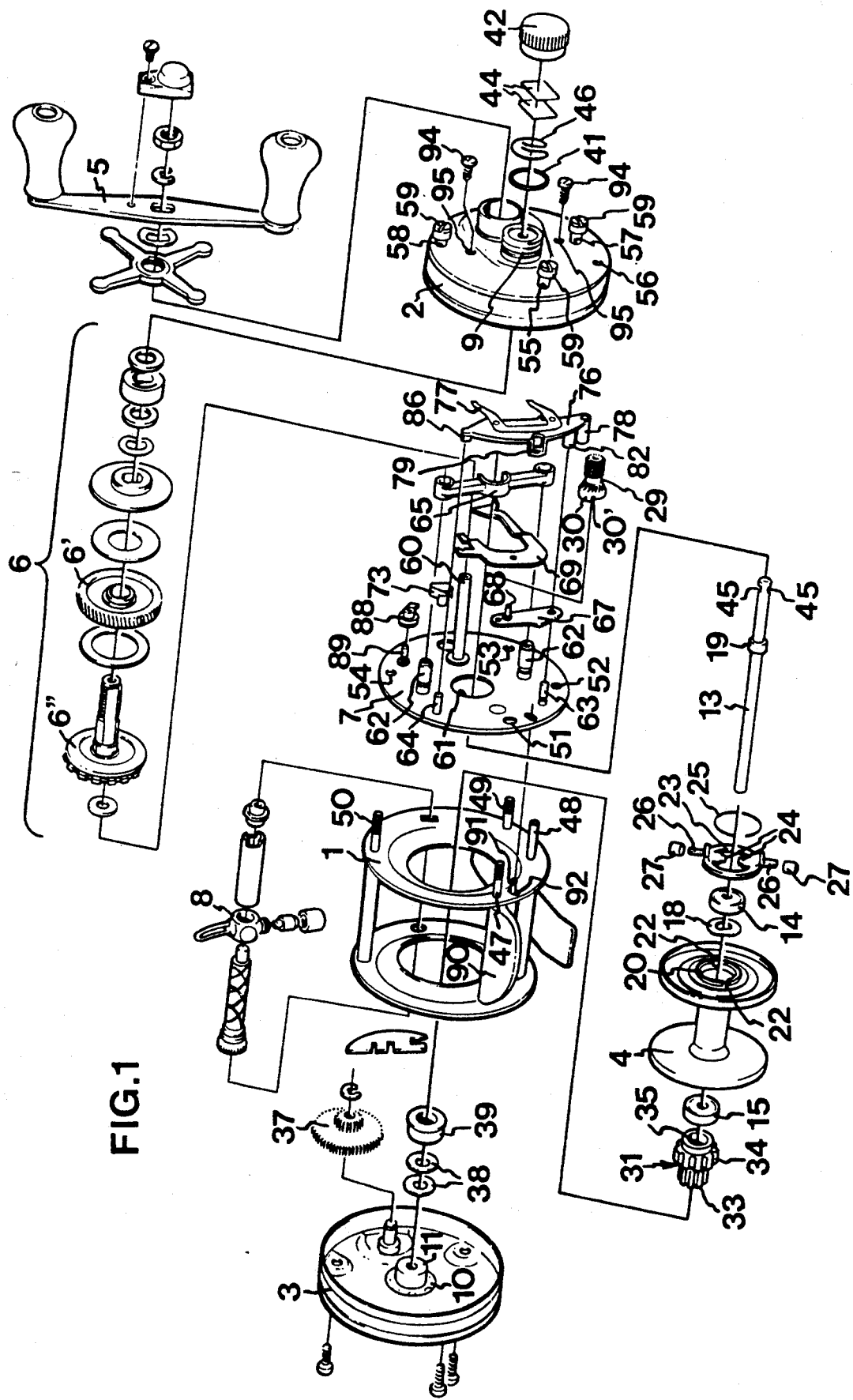
FIG. 1 is an exploded view showing a fishing reel according to the present invention.

The fishing reel of the multiplier type as illustrated in the drawings has a frame 1 with detachable side plates 2 and 3, a spool 4 mounted in the frame 1 for receiving a fishing line (not shown), a handle 5 with an associated transmission mechanism 6 for rotating the line spool 4, a mounting plate 7 fixed on the frame 1 and supporting the handle 5 and the transmission mechanism 6, and a level-wind mechanism 8 mounted in the frame 1.

The handle 5 with the associated transmission mechanism 6 and the level-wind mechanism 8 are of conventional type and therefore will not be described in more detail here.

The right side plate 2 has a central through opening in which a support bearing 9 is fixed. The support bearing 9 is in the form of an externally threaded sleeve projecting from the outside of the side plate 2. The left side plate 3 also has a central through opening in which a support bearing 10 is fixed. The bearing 10 has an axial projection 11 which extends inwardly and has a blind bore 12, the diameter of which is equal to the inner diameter of the sleeve 9. The two support bearings 9 and 10 support the line spool shaft 13 at both ends thereof. As appears from FIG. 2, the shaft 13 passes through the bearing 9. The diameter of the shaft 13 is slightly smaller than the inner diameter of the sleeve 9 and the diameter of the blind bore 12

The line spool 4 is rotatably supported on the shaft 13 by means of two ball bearings 14 and 15. The outer ring of each ball bearing 14 and 15 abuts with its inner end surface on a shoulder 16 and 17, respectively, within the spool. The outer ring of the right ball bearing 14 abuts on the shoulder 16 by the intermediary of a spring washer 18. The outer end surface of the left ball bearing 15 is located a certain distance inwardly of the left end surface of the line spool 4 while the outer end surface of the right ball bearing 14 is located on a level with the right end surface of the line spool 4. A radially projecting annular shoulder 19 formed on the shaft 13 bears on the outer end surface of the inner ring of the right ball bearing 14.

The line spool 4 has a ring 20 which is coaxial with the line spool and integrally formed therewith and which projects axially from the right end surface of the spool. The ring 20 has an external circumferential groove 21 and two diametrically opposed recesses 22. A clutch ring 23 is provided on the ring 20 and has two radially inwardly projecting diametrically opposed projections 24 engaging in the recesses 22 in the ring 20. The clutch ring 23 is maintained in place on the ring 20 by means of a snap ring 25 disposed in the circumferential groove 21 thereof. The clutch ring 23 further has two radially outwardly projecting diametrically opposed pins 26, each carrying a centrifugal weight 27 slidable on the respective pin 26. When the line spool 4 rotates at a high speed, the centrifugal weights 27 engage the inner circumferential surface of a brake ring 28 fixed o the left-hand side of the mounting plate 7. The centrifugal weights 27 and the brake ring 28 thus serve as a centrifugal brake for the line spool 4.

A gear 29 which forms clutch means in a clutch mechanism described in more detail below, and is connected to and driven by the handle 5 via the transmission mechanism 6 is mounted on the shaft 13 between the line spool 4 and the support bearing 9. The end of the gear 29 facing the line spool 4 is cup-shaped with two diametrically opposed lugs 30. When the angler starts turning the handle 5 for retrieving the line, the gear 29 is moved to the left from the neutral position shown in FIG. 2 as described in more detail below, to a coupling position, whereby the shoulder 19 on the shaft 13 is received in the cup of the gear 29 and the lugs 30 are brought into driving engagement with the projection 24 of the clutch ring 23. In order to ensure that this driving engagement takes place in a reliable and uniform manner during the rotation of the gear 29, each lug 30 is preceded by an inclined cam surface 30'. Upon continued rotation of the handle 5, the line spool 4 is rotated about the shaft 13.

A gear wheel unit 31 formed as a single piece is composed of a minor sleeve 32, a minor gear wheel 33, a major gear wheel 34 and a major sleeve 35. The sleeve 35 is inserted in the line spool 4 outside the left ball bearing 15 and non-rotatably connected to the line spool 4 by means of splines (not shown). The sleeve 35 has two radially resilient projections 36 engaging in an inner circumferential groove in the line spool 4 and retaining the sleeve 35 axially therein. The minor gear wheel 33 meshes with a gear wheel 37 for driving the level-wind mechanism 8, and the major gear wheel 34 can be used, in a manner not shown in more detail, for providing a buzzer function.

A friction member 38, consisting of two friction washers of tin bronze, bears on the end surface of the axial projection 11 of the support bearing 10 and is retained thereon by a plastic cap 39 passed over the projection. The plastic cap 39 has a central opening in which the minor sleeve 32 of the gear wheel unit 31 is accommodated. The end surface of the sleeve 32 then engages the friction member 38.

The right support bearing 9 has an outer circumferential groove 40 in which an O-ring 41 is mounted. An inwardly threaded bearing cap 42 is screwed on the support bearing 9. The bearing cap 42 has an internal central recessed portion 43 in its bottom. Two spring leaves 44 of tin bronze bridging the recessed portion 43 are placed in the bearing cap 42.

In its end located in the bearing cap 42, the shaft 13 has two circumferential diametrically opposed grooves 45, the bottoms of which are parallel to each other and form a flat on the shaft. A resilient member 46 bears on the support bearing 9 and is urged against the inner circumferential surface of the bearing cap 42 so as to be non-rotatably retained therein. The resilient member 46 engages in the grooves 45 in the shaft 13 in order, by engaging the flat thereon, to retain the shaft 13 against rotation and, by pressing against the outer side wall of the grooves, to urge the shaft to the right, such that its right end bears on the bottom of the bearing cap 42 by the intermediary of the spring leave 44.

As will have been appreciated, the braking effect of the friction member 38 is adjusted by means of the bearing cap 42. When the bearing cap 42 is screwed further onto the support bearing 9, it will shift the shaft 13 to the left against the action of the resilient member 46, the shoulder 19 on the shaft 13 urging the ball bearing 14 and hence the line spool 4 and the gear wheel unit 31 to the left, such that the sleeve 32 is pressed more firmly against the friction member 38, thus increasing the braking power thereof. Such an increase of the braking power may be required, for instance, when a heavy lure attached to the line should be cast.

When the bearing cap 42 is slightly unscrewed for reducing the braking effect of the friction member 38, the shaft 13 is shifted to the right by the action of the resilient member 46.

At its right-hand side, the frame 1 has four mounting pins 47, 48, 49 and 50 parallel to the shaft 13 and extending through corresponding holes 51, 52, 53 and 54, respectively, in the mounting plate 7 and into corresponding holes 55, 56, 57 and 58, respectively, in the right side plate 2. The side plate 2 and hence the mounting plate 7 are fixed to the frame 1 by means of sleeve-shaped internally threaded fixing screws 59 screwed on the mounting pins 47, 49 and 50, which are threaded.

The mounting plate 7 has a spindle 60 which is parallel to the shaft 13 and on which the handle 5 and the transmission mechanism 6 are mounted. The transmission mechanism 6 includes a driving gear 6' meshing with the clutch means, i.e. the gear 29, and a toothed wheel 6", the function of which will be described in more detail below. The mounting plate 7 has a center hole 61 through which the shaft 13 extends and in which the gear 29 is located. The mounting plate 7 further has two first mounting pins 62 substantially diametrically opposed with respect to the center hole 61 and consisting of internally threaded sleeves, a second mounting pin 63 and a third mounting pin 64. The mounting pins 62, 63 and 64 are parallel to the shaft 13 and projects towards the right side plate 2.

The clutch means, i.e. the gear 29, is operable by a clutch mechanism supported by the mounting plate 7.

A yoke 65 has a central portion 66 in which the gear 29 is rotatably mounted, and is displaceably mounted on the two first mounting pins 62 for shifting the gear 29 along the shaft 13 between the coupling position, in which the gear 29 engages the line spool 4 for rotating it, and the neutral position, in which it is disengaged from the line spool.

A link arm 67 engages the mounting plate 7 and is pivotally mounted at one end on the second mounting pin 63. At its other end, the link arm 67 has a pivot pin 68 projecting towards the side plate 2 parallel to the shaft 13.

A U-shaped member 69 has a first leg 69' and a second leg 69" extending in between the mounting plate 7 and the yoke 65 on each side of the shaft 13, and a web portion 69''' pivotally mounted on the pivot pin 68. The first leg 69' is longer than the second leg 69" and has at its free end a projection 70 parallel to the shaft 13 for cooperating with the toothed wheel 6", and a guide curve 71 for cooperating with the spindle 60. In the illustrated embodiment, this cooperation takes place with a circular lug 60' formed on the spindle 60 adjacent the mounting plate 7. Each of the legs 69' and 69" has a cam portion 72 for cooperating with an oblique surface 65' on the yoke 65.

An arcuate spring 73 has at one end a loop portion 74 placed on the third mounting pin 64. The spring 73 engages at its other end in a recess 75 in the U-shaped member 69 for urging this in such a direction about the pivot pin 68 that the guide curve 71 is pressed against the spindle 60.

A retainer member 76 is arranged between the mounting plate 7 and the side plate 2 for holding in place the yoke 65, the link arm 67 and the U-shaped member 69. The retainer member 76 carries a U-shaped leaf spring 77. The legs of the leaf spring 77 engage the yoke 65 on each side of its central portion 66 for urging the yoke to the left with respect to FIG. 1, i.e. in such a direction that the gear 29 is urged towards its coupling position. The retainer member 76 has two long legs 78 and 79, by means of which it bears on the mounting plate 7, two short legs 80 and 81, by means of which it bears on the two legs 69' and 69" of the U-shaped member 69, and a medium-long leg 82, by means of which it bears on the link arm 67. Each of the long legs 78 and 79 has a through hole 83 and 84, respectively, through which the mounting pins 48 and 47, respectively, pass. The medium-long leg 82 has a recess 85 for receiving the second mounting pin 63. The retainer member 76 has a short sleeve 86 which is placed on the third mounting pin 64 axially outside the loop portion 74 of the spring 73. The retainer member 76 has, between the long leg 79 and the medium-long leg 82, a stop lug 87, the function of which will be described in more detail below.

Figure 3:
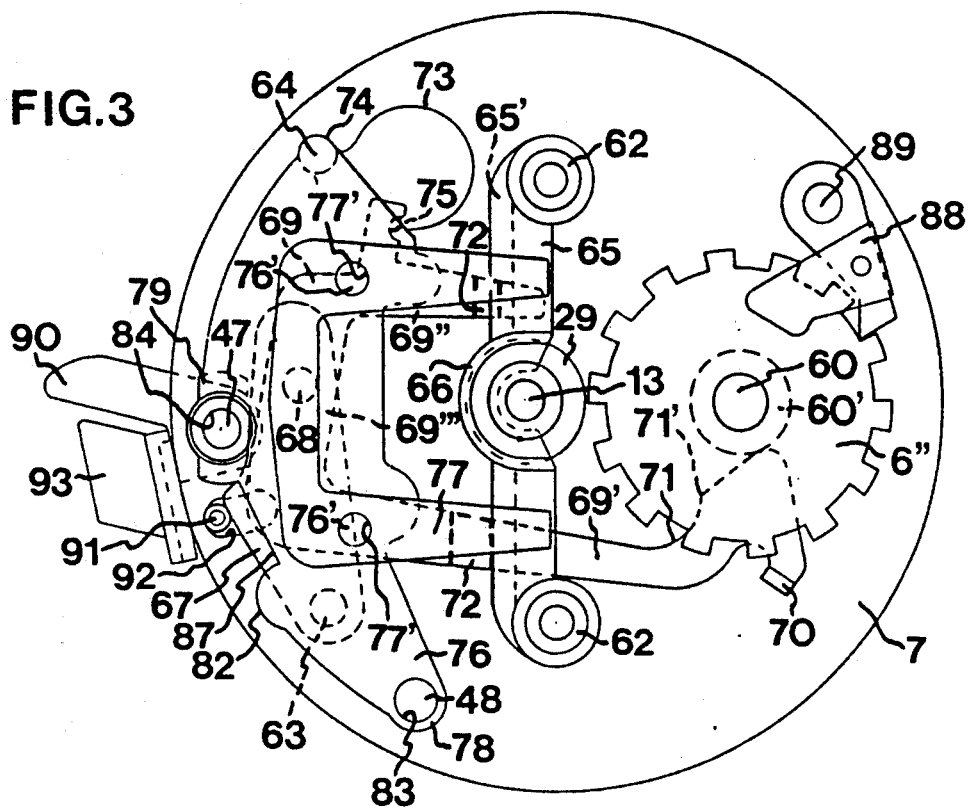
FIGS. 3-5 are partial views further enlarged with respect to FIG. 2 and show a clutch mechanism mounted on a mounting plate, the clutch mechanism being shown in a first, a second and a third position, respectively.
Figure 4:
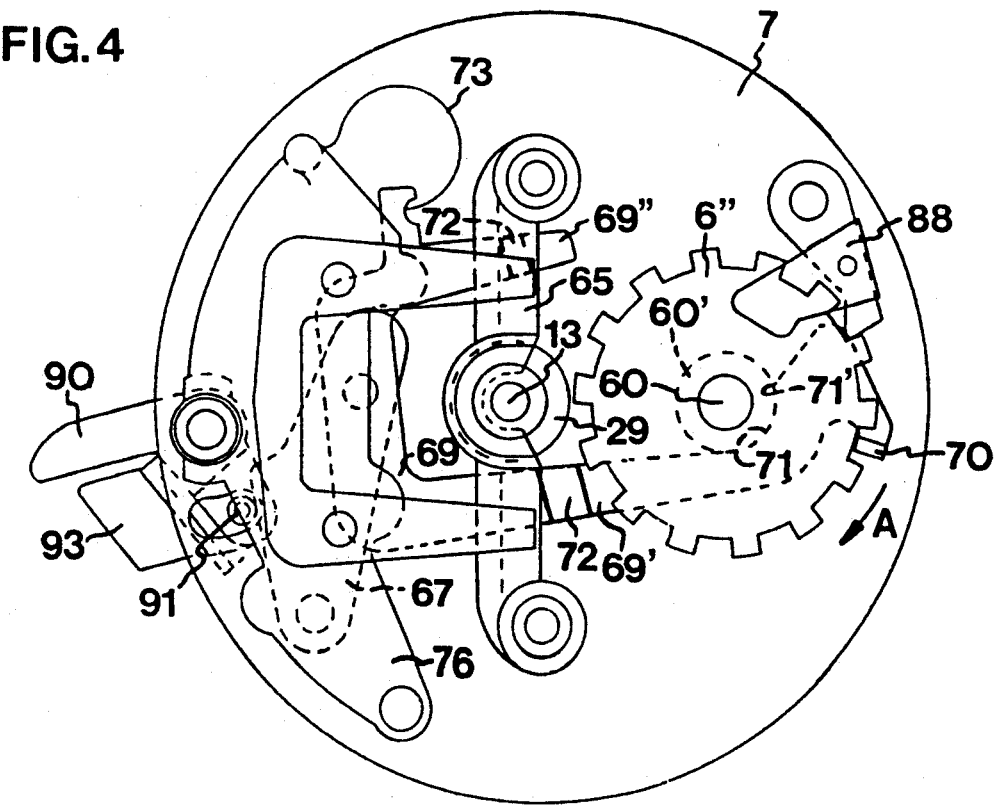

The U-shaped member 69 is pivotable, against the action of the spring 73, between two stable pivoting positions, in which it is retained by the spring 73, namely a first pivoting position, which is shown in FIG. 3 and in which the projection 70 is located radially outside the toothed wheel 6" and the cam portions 72 of the two legs 69' and 69" are located at the side of the yoke 65, which then is held in such a position of displacement by the spring 77 that the gear 29 is in its coupling position, and a second pivoting position, which is shown in FIG. 4 and in which the projection 70 engages the teeth of the toothed wheel 6" and the cam portions 72 of the two legs 69' and 69" have been introduced between the mounting plate 7 and the yoke 65 and moved, against the action of the spring 77, the yoke to such a position of displacement that the gear 29 is in its neutral position.

If the handle 5 is rotated, when the U-shaped member 69 is in its second pivoting position (FIG. 4), in the direction of line retrieve, the toothed wheel 6" is rotated in the direction indicated by arrow A (rotation in the opposite direction is prevented by a pawl 88 mounted on a pin 89 on the mounting plate 7). The projection 70 then is moved apart, such that the U-shaped member 69 is pivoted clockwise with respect to FIG. 4 while the guide curve 71 is pressed against the lug 60' on the spindle 60. When the U-shaped member 69 passes its unstable position of equilibrium, i.e the position in which the crest 71' of the guide curve 71 is situated in line with the spindle 60 and the point of engagement of the spring 73 in the recess 75, the spring 73 moves the U-shaped member 69 to its first pivoting position (FIG. 3), the spring 77 moving the yoke 65 to the position of displacement in which the gear 29 is in its coupling position.

A trigger 90 operable by the thumb is pivotally mounted in the frame 1. The trigger 90 is pivotable about a pin which is an extension of the mounting pin 47. The trigger 90 has an operating stud 91 which is parallel to the shaft 13 and which extends through an elongate hole 92 in the mounting plate 7 and engages the link arm 67. The trigger 90 is maintained in a starting position (FIG. 3) by the spring 73 which, via the U-shaped member 69, the pivot pin 68, the link arm 67 and the operating stud 91, urges the trigger upwards or clockwise with respect to FIG. 3.

When the trigger 90 is pressed downwards or counterclockwise with respect to FIG. 3, from its starting position to a disengaging position, the operating stud 91 pivots the link arm 67 clockwise about the second mounting pin 63 from a first position (FIG. 3), in which the U-shaped member 69 is held in its first pivoting position, to a second position (FIG. 4), in which the U-shaped member 69 is held in its second pivoting position. During this depression or pivotal movement of the trigger 90 counterclockwise, the guide curve 71 of the U-shaped member 69 is pressed against the lug 60' on the spindle 60 by the spring 73. When the U-shaped member 69 passes its unstable position of equilibrium, the spring 73 moves the U-shaped member 69 to its second pivoting position (FIG. 4) the projection 70 being moved, as mentioned above, into engagement with the teeth of the toothed wheel 6" and the yoke 65 being displaced to such a position that the gear 29 is located in its neutral position. Even if the trigger 90 is released, the U-shaped member 69 is maintained in its second pivoting position until the handle 5 is turned in the direction of line retrieve, as described above.

Figure 2:
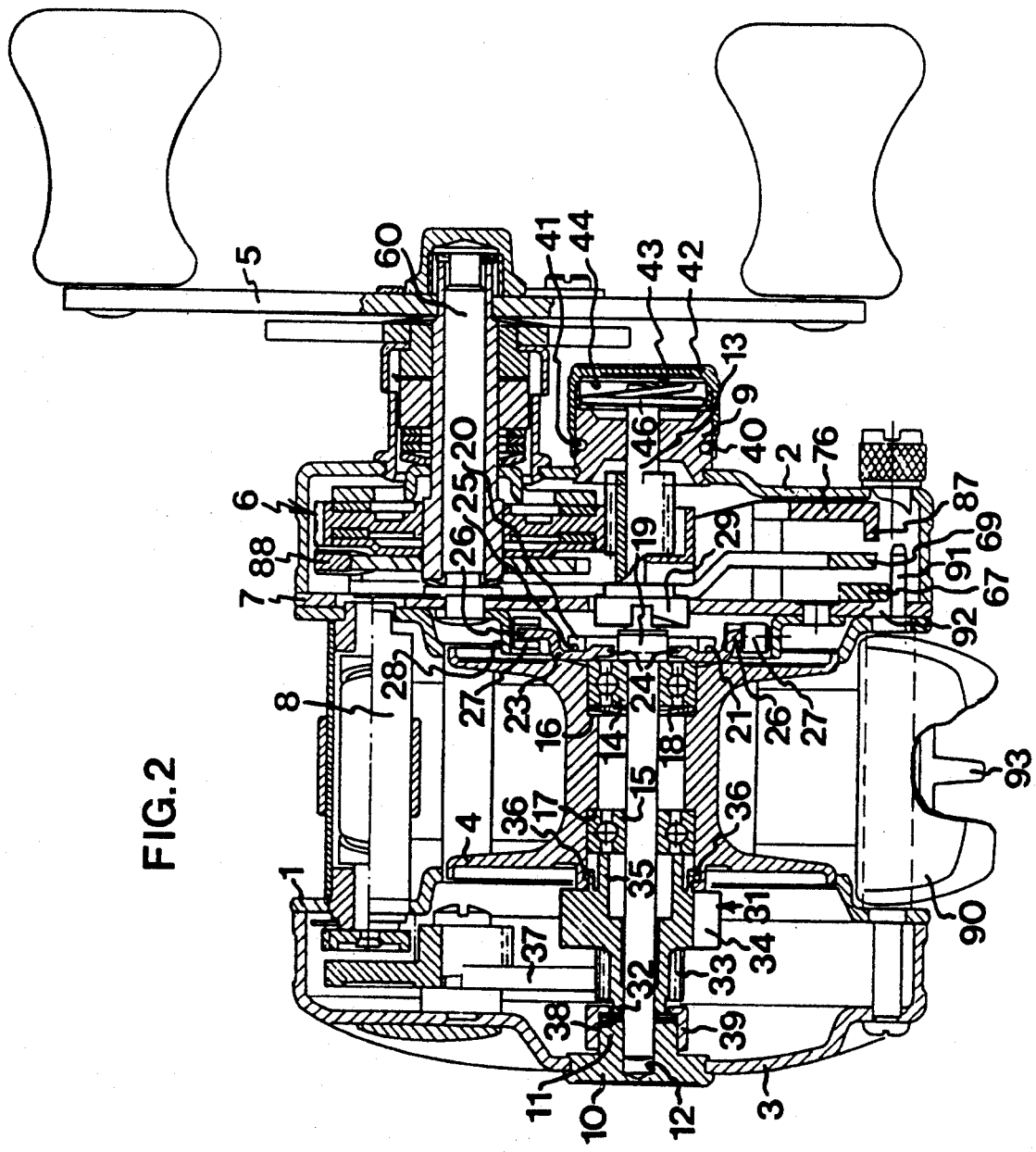
FIG. 2 is an enlarged longitudinal section of the fishing reel shown in FIG. 1.

The trigger 90 has a switch 93 which is connected to the operating stud 91 and by means of which this stud is axially displaceable from the position shown in FIG. 2, to a position in which it extends beyond the link arm 67 in order, when depressing the trigger 90 from its starting position towards its disengaging position, to be brought into engagement with the stop lug 87 formed on the retainer member 76 when the trigger reaches an intermediate position (FIG. 5), in which the link arm 67 has not yet reached its second position and the U-shaped member 69 has not yet reached its unstable position of equilibrium. When the trigger 90 is in this intermediate position, the U-shaped member 69 is in such a pivoting position (FIG. 5) that the projection 70 is situated slightly radially outside the toothed wheel 6" and the cam portions 72 of the two legs 69' and 69" have moved the yoke 65 to such a position of displacement that the gear 29 is in its neutral position.

Figure 5:
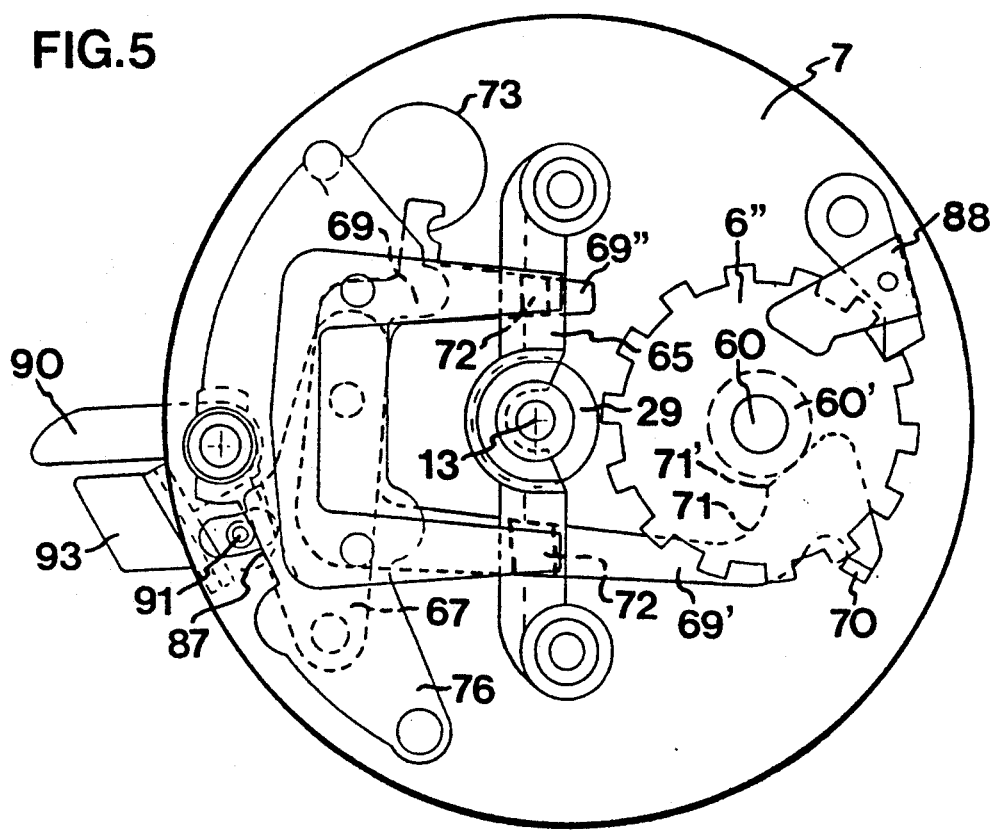

As long as the trigger 90 is held depressed in this intermediate position, the clutch mechanism is maintained in the position shown in FIG. 5. As soon as the trigger 90 is released, the clutch mechanism is returned to the position shown in FIG. 3, in which the gear 29 is in its coupling position. Thus, the gear 29 can be returned more quickly to its coupling position than in the case described above when the return movement is carried out by means of the handle 5.

Figure 6:
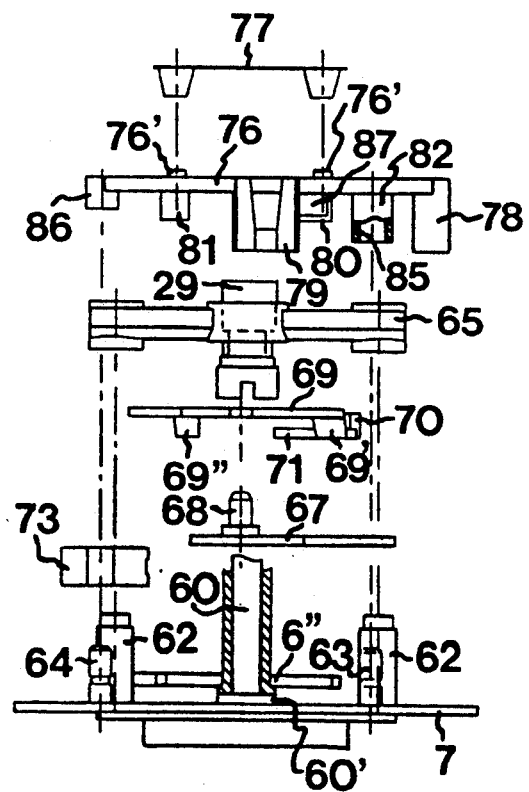
FIG. 6 is an exploded view illustrating how the clutch mechanism is mounted on the mounting plate.

The mounting of the clutch mechanism on the mounting plate 7 will now be described with reference to FIG. 6.

The link arm 67 is mounted on the second mounting pin 63, whereupon the U-shaped member 69 is mounted on the pivot pin 68 with the legs 69' and 69" located on each side of the center hole 61 of the mounting plate 7. The yoke 65 with the gear 29 mounted therein is thereafter placed on the first mounting pins 62, the gear 29 being disposed in the center hole 61 of the mounting plate 7. The transmission mechanism 6, which in FIG. 6 is only represented by the toothed wheel 6", is thereafter applied to the spindle 60. The spring 73 is placed on the third mounting pin 64, whereupon the retainer member 76 with the spring 77 mounted thereon is finally placed on the mounting pins 63 and 64, such that the legs of the spring 77 engage the yoke 65 on each side of its center portion 66. The retainer member 76, preferably made of polymer material, has two pins 76' which, when mounting the spring 77 on the retainer member, are inserted in corresponding holes 77' in the spring, which is then secured by hot welding.

The right side plate 2 is applied to the mounting plate 7 and secured thereto by means of two screws 94 which are screwed, through holes 95 in the side plate 2, into the first mounting pins 62. The thus applied side plate 2 engages the retainer member 76 and holds it axially in place on the mounting plate 7. The unit consisting of the mounting plate 7 with the clutch mechanism mounted thereon, and the side plate 2 is then mounted on the frame 1, the mounting pins 47, 48, 49 and 50 being passed through corresponding holes 51, 52, 53 and 54, respectively, in the mounting plate 7 into corresponding holes 55, 56, 57 and 58, respectively, in the side plate 2. The mounting pins 47 and 48 are then also passed through the holes 84 and 83, respectively, in the long legs 79 and 78, respectively, of the retainer member 76. Said unit is fixed on the frame 1 by means of the three sleeve-shaped fixing screws 59 which are screwed on the threaded mounting pins 47, 49 and 50.

What I claim and desire to secure by Letters Patent is:

1. A fishing reel of the multiplier type comprising
a frame with two side plates;
a line spool shaft extending through said frame;
a rotatable line spool mounted on said shaft;
a mounting plate arranged on the frame inwardly of one side plate thereof and having a spindle parallel to the line spool shaft and extending through said one side plate, a center hole through which the line spool shaft extends, two first mounting pins substantially diametrically opposed with respect to said center hole, a second mounting pin and a third mounting pin, said first, second and third mounting pins being parallel to the line spool shaft and projecting towards said one side plate;
a handle mounted on said spindle outwardly of said one side plate;
a driving gear and a toothed wheel which are mounted on said spindle and adapted to be rotated by means of said handle;
clutch means mounted on the line spool shaft in the center hole of said mounting plate and having a gear portion meshing with said driving gear to be rotated thereby, and being displaceable along the line spool shaft between a coupling position, in which it engages the line spool for rotation thereof, and a neutral position, in which it is disengaged from the line spool;
a yoke having a center portion, in which said clutch means is rotatably mounted, and being displaceably mounted on said two first mounting pins for shifting said clutch means between said two positions;
a retainer member arranged between said mounting plate and said one side plate and supporting first resilient means adapted to press said yoke in such a direction that said clutch means is urged towards its coupling position;
a link arm pivotally mounted at one end on said second mounting pin and having at its other end a pivot pin projecting towards said one side plate parallel to the line spool shaft;
a substantially U-shaped member having a first and a second leg extending in between said mounting plate and said yoke on each side of the line spool shaft, and a web portion pivotally mounted on the pivot pin of said link arm, the first leg of said U-shaped member having at its free end a projection for cooperating with said toothed wheel, and a guide curve for cooperating with said spindle, and each leg having a cam portion for cooperating with said yoke;
second resilient means mounted on the third mounting pin and engaging with the U-shaped member for urging it in such a direction about said pivot pin that said guide curve is pressed against said spindle, said U-shaped member being pivotable against the action of said second resilient means between two stable pivoting positions in which it is held by said second resilient means, namely a first pivoting position in which said projection is located radially outwardly of said toothed wheel and the cam portions of said two legs are located at the side of said yoke which then is held in such a position of displacement by said first resilient means that said clutch means is in its coupling position, and a second pivoting position in which said projection engages said toothed wheel in order, upon rotation of the handle, to be removed thereby and, together with said second resilient means, move said U-shaped member to its first pivoting position, and in which the cam portions of said two legs have been introduced between the mounting plate and the yoke and, against the action of said first resilient means, have moved the yoke to such a position of displacement that said clutch means is in its neutral position;
and a trigger by means of which said link arm is pivotable against the action of said second resilient means on said U-shaped member about said second mounting pin between a first position and a second position, in which said U-shaped member is maintained in its first and its second pivoting position, respectively, by said second resilient means;
said trigger pivotally mounted on a pin parallel to the line spool shaft and carried by the frame, and wherein said trigger has an operating stud parallel to the line spool shaft and extending through an elongate hole in the mounting plant for engaging the link arm in order, when said trigger is pivoted from a starting position to a disengaging position, to move the link arm from its first position to its second position;
said trigger carrying a switch by means of which the operating stud is axially displaceable to a position in which it extends beyond the link arm in order, when said trigger is pivoted from said starting position towards said disengaging position, to be brought into engagement with a stop lug formed on said retainer member when said trigger comes to an intermediate position and, hence, before the link arm reached its second position, the cam portions of said U-shaped member being so shaped as to hold said yoke in such a position of displacement that the clutch means is disengaged from the line spool when said trigger is in said intermediate position, and the position of said stop lug being such that said second resilient means will return said U-shaped member to its first pivoting position when said trigger is released when in said intermediate position.

* * * * *